UNITED STATES PATENT OFFICE.

JAMES H. GRAVELL, OF PHILADELPHIA, PENNSYLVANIA.

CHEMICAL PRIMER FOR ZINC.

1,221,046. Specification of Letters Patent. Patented Apr. 3, 1917.

No Drawing. Application filed July 22, 1916. Serial No. 110,691.

*To all whom it may concern:*

Be it known that I, JAMES H. GRAVELL, a citizen of the United States, and a resident of Philadelphia, in the county of Philadelphia and State of Pennsylvania, have invented a certain new and useful Chemical Primer for Zinc, of which the following is a specification.

This invention relates to depositing adherent coatings on zinc.

The object of the invention is the formation of an adherent non-metallic coating on zinc, for decorative purposes and for the purpose of acting as a binding surface between the metal and a covering of paint.

It is well known in the art that metals of the zinc class will not retain a covering of paint; artists use zinc palettes for mixing their colors because it is well known that when the paint dries, it can be easily removed with the palette-knife. In the building trades it is well recognized that paint will not hold to galvanized iron (zinc plated steel) and many buildings using trimmings of this material over which paint is applied, evidence the fact in a few years, by their unsightly appearance caused by the paint peeling off.

The chemical combination which I shall describe and finally claim prevents the peeling of paint from surfaces of zinc and galvanized iron, by producing a non-metallic coating, white or light gray in color and of the nature of stone. The coating is firmly attached to the surface of the zinc and is absorbent in character so that any fluid placed on the surface is absorbed into the pores of the coating and becomes inseparable on drying.

Such a coating can be produced by applying a solution of phosphoric acid in combination with some other mineral acid, both dissolved in the same suitable solvent, such as water or alcohol. Phosphoric acid alone in solution produces a very uneven and unsuitable coating consisting mostly of phosphoric acid which by the evaporation of the solvent is left in a dry state and which is soluble in water. This is likewise true of the other mineral acids, such as sulfuric, hydrochloric or nitric, for the salts of zinc formed by these acids are also soluble in water and worthless for holding a covering of paint. But when any one of these acids, or their equivalent, is combined with phosphoric acid in a suitable solvent, such as water or alcohol, a heavy, adherent, absorbent coating is formed which is most suitable for retaining a covering of paint or stain.

The admixture of phosphoric and nitric acids forms a good combination, although I do not wish to limit myself to the use of nitric acid as I may use sulfuric acid or even hydrochloric acid. The best solvent for commercial purposes is alcohol as this tends to remove any oil which may happen to be on the material under treatment and which, if not removed, prevents the action of the acids.

Although the proportions of the acids used may vary considerable I have found that six parts of the mineral acid to eight parts of phosphoric acid (ortho-phosphoric acid) form a very suitable combination when dissolved in fifty parts of water or alcohol. All these proportions are by volume and the acids are of strong commercial strength.

This admixture produces a white adherent coating resembling stone, which is suitable for protecting the metal from the action of the weather, or for decorative purposes or for holding a covering of paint or stain. The coating produced holds firmly to the surface and may be burnished without causing it to detach itself from the surface of the metal.

Paint which, after drying, could be easily removed with the finger-nail when applied directly to zinc or galvanized iron, requires the use of a knife to remove it when applied to a surface treated with my chemical.

My chemical admixture as described produces a white or light gray coating but the color may be varied by adding to the admixture certain dyes not affected by the acids or various soluble metallic salts. For instance, fuchsin (anilin red) produces a red coating, whereas silver nitrate produces a black coating by reaction with the zinc.

The method of applying my chemical is similar to that of applying an ordinary paint, that is it may be applied with a brush or the material may be dipped into a bath of my chemical. Sufficient time is then allowed for the surface to become entirely dry before anything further is done to the surface, such as painting, staining or burnishing.

What I claim is:

1. A chemical composition of matter for producing a coating on zinc comprising an admixture consisting of a free mineral acid and free phosphoric acid.

2. A chemical composition of matter for producing a coating on zinc comprising an admixture consisting of free mineral acid, free phosphoric acid, and a solvent.

3. A chemical composition of matter for producing a coating on zinc comprising an admixture containing a mineral acid and phosphoric acid dissolved in a solvent which of itself has no action on the metal.

4. A chemical composition of matter for producing a coating on zinc consisting of an admixture of free nitric acid, a solution of free phosphoric acid, and a solvent.

5. A chemical composition of matter for producing a coating on zinc consisting of an admixture of nitric acid and phosphoric acid dissolved in water.

JAMES H. GRAVELL.